United States Patent [19]

Kuo et al.

[11] 4,137,201
[45] Jan. 30, 1979

[54] CYCLIC PHOSPHONITE STABILIZED CELLULOSE ESTER COMPOSITIONS

[75] Inventors: Chung-Ming Kuo; Richard H. S. Wang; Richard T. Bogan, all of Kingsport, Tenn.

[73] Assignee: Eastman Kodak Company, Rochester, N.Y.

[21] Appl. No.: 830,296

[22] Filed: Sep. 2, 1977

[51] Int. Cl.² .................... C08L 1/10; C08L 1/12; C08L 1/14
[52] U.S. Cl. ..................... 260/13; 260/45.8 R; 264/177 F; 264/200
[58] Field of Search ............ 260/13, 936, 45.8 R

[56] References Cited

U.S. PATENT DOCUMENTS 3,014,956 12/1961 Birum ........................... 260/45.8 R
3,702,878 11/1972 Saito ............................. 260/936

FOREIGN PATENT DOCUMENTS 162275 3/1955 Australia ........................... 260/13
553350 2/1958 Canada ............................. 260/13

Primary Examiner—Edward M. Woodberry
Attorney, Agent, or Firm—Clyde L. Tootle; Daniel B. Reece, III

[57] ABSTRACT

This invention is directed to a new thermal stabilizer system for cellulose esters and their commercially useful formulated compositions which can be molded, shaped and otherwise processed in a thermoplastic condition at elevated temperatures to provide products having (1) better molecular weight retention and (2) less discoloration after thermal processing when compared to similar cellulose ester compositions containing prior art stabilizers.

8 Claims, No Drawings

CYCLIC PHOSPHONITE STABILIZED CELLULOSE ESTER COMPOSITIONS

This invention is directed to a new thermal stabilizer system for cellulose esters and their commercially useful formulated compositions which affords products having improved molecular weight retention and less discoloration after thermal processing.

Cellulose esters have been used extensively to prepare various molded, shaped, formed or extruded articles. It is conventional that the cellulose ester compositions used in such operations be processed at elevated temperatures in a molten or thermoplastic condition. Such cellulose esters, particularly those prepared from wood pulps, become discolored and undergo loss inherent viscosity (I.V.) when subjected to high temperature processes such as extrusion or injection molding operations. Various materials have been suggested for stabilizing cellulose esters against the effects of elevated temperatures. These suggested stabilizers in general have not been effective in improving the thermal stability of cellulose esters to the extent desired, and in some cases have imparted some undesirable characteristic to the formulation primarily in the form of loss of molecular weight.

An object of this invention is to prepare cellulose esters and their compositions which retain color and molecular weight stability when subjected to elevated temperatures and which also are of excellent clarity. Another object of this invention is to provide a cellulose ester plastic composition which is useful for manufacture of film, sheet and molded objects having good color and molecular weight stability and good physical properties.

In accordance with the present invention, a stabilizing system is provided for cellulose esters which comprises: (A) at least one cyclic phosphonite compound having the formula

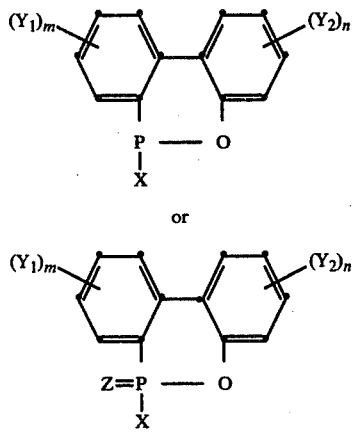

wherein

X is hydrogen, hydroxyl, amino, alkyl having 1 to 22 carbon atoms, alkoxy having 1 to 22 carbon atoms, alkylthio, aryloxy or arylthio having 1 to 22 carbon atoms;

$Y_1$ is alkyl having 1 to 18 carbon atoms;

$Y_2$ is halogen, alkyl having 1 to 18 carbon atoms, alkoxy having 1 to 18 carbon atoms, nitro, cyano or sulfonic acid radical; and $Y_1$ and $Y_2$ combined with a biphenyl ring form a phenanthrene ring;

Z is an oxygen or sulfur atom; and m and n are whole numbers ranging from 0 to 4;

in combination with (B) a conventional antixoidant and (C) an acid accepting epoxy compound. The stabilizing combination which we have found particularly useful for stabilizing cellulose esters is the combination of 9,10-dihydro-9-oxa-10-phosphaphemanthrene-10-oxide (HCA), tetrakis[methylene(3,5-di-tert-butyl-4-hydroxyhydrocinnmate)methane] (Irganox 1010), and either an epichlorohydrin/bisphenol A type epoxy resin (Epon 815) having a viscosity (25° C.) of 5-7 poise, an epoxide equivalent of 175-195, and an average molecular weight of ≃330 or neopentyl glycol diglycidyl ether. The cyclic phosphonite compounds can be obtained commercially from Sanko Chemical Co., Ltd., Tokyo, Japan, or prepared according to the disclosure of U.S. Pat. No. 3,702,878.

Any other conventional antioxidants can be used in place of the tetrakis[methylene(3,5-di-tert-t-butyl-4-(hydroxyhydrocinnamate)methane] and provide similar results. Such conventional antioxidants are well known in the art and include organic phosphite antioxidants, thiodipropionic acid ester antioxidants, phenolic antioxidants which contain one or more phenolic nuclei. Examples of such organic phosphite antioxidants are, for example, trimethyl phosphite, triphenyl phosphite, tris(-nonylphenyl)phosphite, and the like. Examples of such thiodipropionate acid ester antioxidants are, for example, dilaurylthiodipropionate, laurylstearylthiodipropionate, distearylthiodipropionate, and the like. Examples of such phenolic antioxidants are 2,6-di-tertiarybutyl-4-methyl phenol, nonyl phenol, phenyl phenol, tetrokis[methylene(3,5-di-tertiary-butyl-4-hydroxyhydrocinnamate)methane], resorcinol, and 2,4,6-tris(3,5-di-tertiary-butyl-4-hydroxybenzyl)mesitylene, and 1,3,5-tris(3,5-ditertiarybutyl-4-hydroxybenzyl) isocyanurate.

Also, any conventional acid accepting epoxy compound can be used with similar results. Such acid accepting epoxy compounds are known to the art and include diglycidyl ethers of various polyglycols, particularly those polyglycols that are derived from condensation of say 8 to 40 moles of ethylene oxide or the like per mole of polyglycol product; diglycidyl ethers of glycerol and the like; metallic epoxy compounds (such as those conventionally utilized in and with vinylchloride polymer compositions); epoxidized ether condensation products; diglycidyl ethers of bisphenol A (i.e., 4,4'-dihydroxy diphenyl dimethyl methane); epoxidized unsaturated fatty acid esters, particularly 4 to 2 carbon atom or so alkyl esters of 2 to 22 carbon atom fatty acids such as butyl epoxy stearate and the like; and various epoxidized long chain fatty acid triglycerides and the like, such as the epoxidized vegetable and other unsaturated natural oils (which are sometimes referred to as being epoxidized natural glycerides or unsaturated fatty acids, which fatty acids generally contain between 12 and 22 carbon atoms) that may be specifically typified and particularized by such compositions as epoxidized soya bean oil.

Various concentrations of the combination of the compounds are effective in stabilizing cellulose esters. For example, the cyclic phosphonite compound having the formula

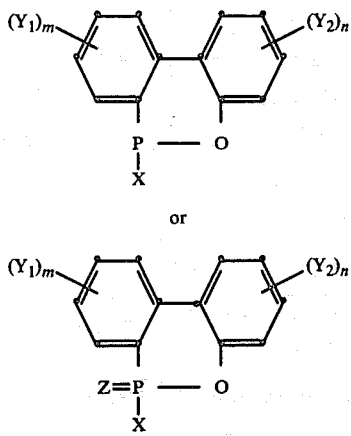

wherein

X is hydrogen, hydroxyl, amino, alkyl having 1 to 22 carbon atoms, alkoxy having 1 to 22 carbon atoms, alkylthio, aryloxy or arylthio having 1 to 22 carbon atoms;

$Y_1$ is alkyl having 1 to 18 carbon atoms;

$Y_2$ is halogen, alkyl having 1 to 18 carbon atoms, alkoxy having 1 to 18 carbon atoms, nitro, cyano or sulfonic acid radical; and $Y_1$ and $Y_2$ combined with a biphenyl ring form a phenanthrene ring;

Z is an oxygen or sulfur atom; and m and n are whole numbers ranging from 0 to 4, is generally used in an amount of 0.10 to 1.0 parts per weight per 100 parts of cellulose ester. The convential antioxidant can generally be used in an amount of 0.05 to 1.0 parts by weight per 100 parts cellulose ester. The acid accepting epoxy compound can generally be used in an amount of 0.5 to 3.0 parts by weight per 100 parts cellulose ester depending on the activity of the compound used. For example, when weak acid accepting epoxized natural glycerides are used, a greater amount is necessary to obtain optimum stabilization such as up to 3 parts per 100 parts cellulose ester. Amounts of each of the combination can be used in lesser amounts but do not provide satisfactory stabilization for some uses, and greater amounts merely increase the cost without any significant increase in stabilization. For obtaining optimum color and molecular weight stability, the preferred concentration ranges of one particular combination of the stabilizers are as follows:

| Compound | Parts by Weight/100 Parts of Cellulose Esters |
|---|---|
| HCA | 0.10–0.3 |
| Irganox 1010 | 0.05–0.1 |
| Epon 815 | 0.5–1.5 |

Conventional cellulose ester stabilizers may also be incorporated in the cellulose ester compositions of this invention. For example, the known potassium acid oxalate and acid citrate stabilizers may be employed without adverse effects. Also, the stabilized celluose ester compositions can contain conventional plasticizers, pigments, colorants, and the like.

The cellulose esters which are stabilized in accordance with this invention are commercial organic cellulose esters of aliphatic acids, such as cellulose acetate, cellulose propionate, cellulose butyrate, cellulose acetate propionate, cellulose acetate butyrate, and the like.

The following examples illustrate the use of the stabilizer system in accordance with this invention.

EXAMPLE 1

One hundred parts of cellulose acetate (CA-400-25) having an acetyl content of about 40 weight percent and 25 seconds viscosity (ASTM D1343) was thoroughly mixed with 36.7 parts of diethyl phthalate (plasticizer) and the amounts of stabilizers listed below. Compression molded plates were made from these mixtures and properties of the cellulose acetate plastic such as roll color, heat teat color, and heat test I.V. were determined.

The roll color was determined using a Gardner Color Difference Meter on the pressed pates. The heat test color was determined by heating the acetate plastic to 205° C. for one hour and comparing the heated samples with known standards. The higher numbers indicate more discoloration. The heat test I. V. of the formulations was determined after the cellulose acetate plastic had been heated to 250° C. for 30 minutes. These test results show that a cellulose ester formulation having relatively good thermal stability is improved further by use of the stabilizer system.

| Stabilizer[1] | | | Property | | |
|---|---|---|---|---|---|
| HCA | Irganox 1010 | Epon 815 | Roll Color | Heat Test Color | Heat Test I.V. |
| 0 | 0 | 0 | 14.2 | 40 | 0.90 |
| 0.15 | 0.1 | 0.5 | 12.1 | 25 | 0.80 |
| 0.15 | 0.1 | 1.0 | 12.3 | 25 | 1.14 |
| 0.15 | 0.1 | 1.5 | 12.4 | 25 | 1.22 |

[1]Parts per 100 parts by weight of cellulose acetate.

EXAMPLE 2

Cellulose acetate (CA-400-25) plastic compositions were prepared and tested in a manner similar to that described in Example 1, except that a poorer quality cellulose ester was used. The test results show that a relatively poor quality ester formulation can be effectively upgraded by the stabilizer.

| Stabilizer[1] | | | Property | | |
|---|---|---|---|---|---|
| HCA | Irganox 1010 | Epon 815 | Roll Color | Heat Test Color | Heat Test I.V. |
| 0 | 0 | 0 | 17.4 | 65 | 1.22 |
| 0.15 | 0.18 | 1.0 | 13.8 | 40 | 1.00 |
| 0.19 | 0.18 | 0.5 | 13.1 | 35 | 1.14 |
| 0.19 | 0.18 | 1.0 | 13.1 | 45 | 1.04 |

[1]Parts per 100 parts by weight of cellulose acetate.

EXAMPLE 3

Cellulose acetate (CA-400-25) plastic compositions were prepared in a manner similar to that described in Example 1, except that the tests were run by heating the cellulose ester plastic compositions at 205-208°C. in a heated block for one hour, and the increase in plastic color was determined using Gardner Color Standards. The test results indicate that prior art thermal stabilizers such as neopentyl phenyl phosphite (NPPP) are not nearly as effective as the HCA-based stabilizers.

| Stabilizer[1] | | | | Gardner Color[2] Rating |
|---|---|---|---|---|
| HCA | NPPP[3] | Irganox 1010 | Epon 815 | |
| 0 | 0 | 0 | 0 | 7-8 |
| 0.15 | 0 | 0.1 | 1.0 | 3 |
| 0.30 | 0 | 0.1 | 1.0 | 3 |
| 0.50 | 0 | 0.1 | 0 | 3 |
| 0 | 0.10 | 0.1 | 1.0 | 4-5 |
| 0 | 0.15 | 0.1 | 1.0 | 4-5 |
| 0 | 0.30 | 0.1 | 1.0 | 6-7 |
| 0 | 0.50 | 0.1 | 0 | 10-11 |

[1]Parts per 100 parts by weight of cellulose acetate.
[2]Higher numbers signify more sample discoloration.
[3]NPPP = Neopentyl phenyl phosphite.

EXAMPLES 4

Cellulose acetate butyrate (CAB-381-20) having an acetyl content of 12 to 13 weight percent and a butyryl content of 36 to 37 weight percent and 20 seconds viscosity (ASTM D1343) and cellulose acetate propionate (CAP-482-20) having an acetyl content of 2.0 to 2.5 weight percent and a propionyl content of 46 to 47 weight percent and 20 seconds viscosity (ASTM D1343) plastic compositions were prepared and tested in a manner similar to that described in Example 3, except that dibutyl azelate (five parts) was used as the plasticizer. The test results indicate that mixed esters such as CAB-381-20 and CAP482-20 are effectively stabilized to prevent color formulation using this invention.

| Cellulose Ester | Stabilizer[1] | | | Gardner Color Rating |
|---|---|---|---|---|
| | HCA | Irganox 1010 | Epon 815 | |
| CAB-381-20 | 0 | 0 | 0 | 11-13 |
| CAB-381-20 | 0.1 | 0.1 | 1.0 | 3-4 |
| CAP-482-20 | 0 | 0 | 0 | 12-14 |
| CAP-482-20 | 0.15 | 0.1 | 1.0 | 4-5 |

[1]Parts per 100 parts by weight of cellulose ester.

EXAMPLE 5

Cellulose acetate (CA-394-60) having an acetyl content of about 39.4 weight percent and 60 seconds viscosity (ASTM D1343) plastic compositions were prepared and tested in a manner similar to that described in Example 3. The test results indicate that even cellulose acetate made from lower-grade wood pulps having higher hemicellulose contents are improved by use of this stabilizer system.

| Stabilizer | | | Gardner Color Rating |
|---|---|---|---|
| HCA | Irganox 1010 | Epon 815 | |
| 0 | 0 | 0 | >13 |
| 0.40 | 0.1 | 1.0 | 4-5 |

EXAMPLE 6

Cellulose acetate (CA-400-25) plastic formulations were prepared and tested in a manner similar to that described in Example 3. The heat test I.V. of the formulations was determined after the cellulose acetate plastic has been heated at 25° C. for 30 minutes. The test results show that the combination of HCA and epoxide compound (NPGDE) provided a better thermal stabilizing system for cellulose acetate plastics than either HCA or epoxide compound alone.

| Stabilizer[1] | | Gardner Color Rating | Heat Test I.V. |
|---|---|---|---|
| HCA | NPGDE | | |
| 0 | 0 | 8 | 1.01 |
| 0 | 1.0 | 8 | 1.09 |
| 0.15 | 0 | 5 | 0.33 |
| 0.15 | 1.0 | 4 | 1.11 |
| 0.15 | 0.4 | 4+ | 1.00 |

[1]Parts per 100 parts by weight of cellulose acetate.

The invention has been described in detail with particular reference to certain preferred embodiments thereof, but it will be understood that variations and modifications can be effected within the spirit and scope of the invention.

We claim:

1. A cellulose ester plastic composition containing a thermally stabilizing amount of the combination of
   (A) about 0.10 to 1 part by weight of at least one cyclic phosphonite compound having the formula

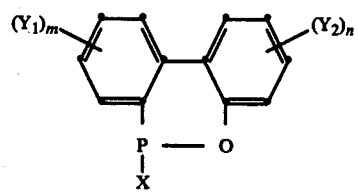

or

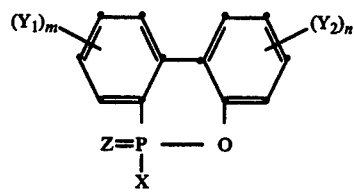

wherein
X is hydrogen, hydroxyl, amino, alkyl having 1 to 22 carbon atoms, alkoxy having 1 to 22 carbon atoms, alkylthio, aryloxy or arylthio having 1 to 22 carbon atoms;
$Y_1$ is alkyl having 1 to 18 carbon atoms;
$Y_2$ is halogen, alkyl having 1 to 18 carbon atoms, alkoxy having 1 to 18 carbon atoms, nitro, cyano or sulfonic acid radical;
$Y_1$ and $Y_2$ combined with a biphenyl ring form a phenanthrene ring;
Z is an oxygen or sulfur atom;
m and n are whole numbers ranging from 0 to 4;
   (B) a conventional antioxidant; and
   (C) an acid accepting epoxy compound.

2. A cellulose ester plastic composition according to claim 1 wherein said acid accepting epoxy compound is a member of the group consisting of compounds having the formula

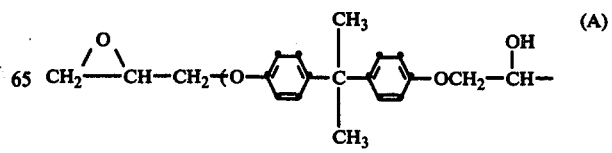

-continued

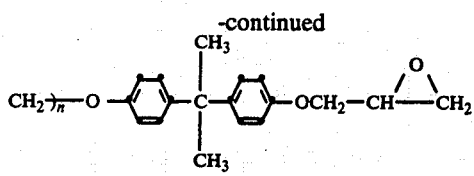

where n = 0 to 12;
(B) neopentyl glycol diglycidyl ether;

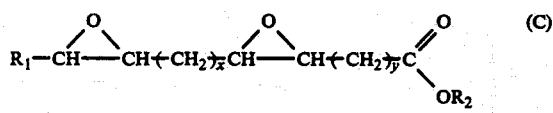

wherein $R_1$ is an alkylene having 1 to 12 carbon atoms, or arylene which can be substituted with alkyl or hydroxy;
x and y is 1 to 10;
$R_2$ is methyl, ethyl, propyl, butyl, hexyl or octyl;
(D) epoxidized tallate; and
(E) epoxidized soybean oil.

3. A cellulose ester plastic composition according to claim 2 wherein said conventional antioxidant is a member of the group consisting of (A) organic phosphite antioxidants, (B) thiodipropionate acid ester antioxidants, and (C) phenolic antioxidants which contain one or more phenolic nuclei.

4. A cellulose ester plastic composition containing a thermally stabilizing amount of the combination of
(A) about 0.10 to 1 part by weight of at least one cyclic phosphonite compound having the formula

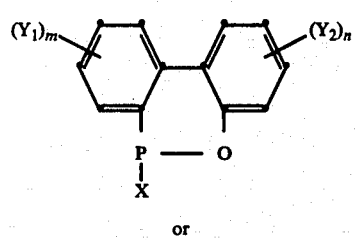

or

-continued

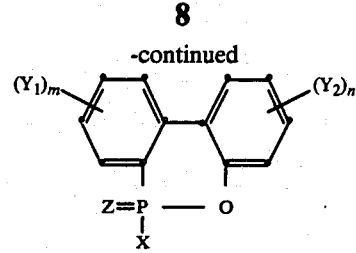

wherein
X is hydrogen, hydroxyl, amino, alkyl having 1 to 22 carbon atoms, alkoxy having 1 to 22 carbon atoms, alkylthio, aryloxy or arylthio having 1 to 22 carbon atoms;
$Y_1$ is alkyl having 1 to 18 carbon atoms;
$Y_2$ is halogen, alkyl having 1 to 18 carbon atoms, alkoxy having 1 to 18 carbon atoms, nitro, cyano or sulfonic acid radical;
$Y_1$ and $Y_2$ combined with a biphenyl ring form a phenanthrene ring;
Z is an oxygen or sulfur atom;
m and n are whole numbers ranging from 0 to 4;
(B) about 0.50 to 3 parts by weight of at least one member of the group consisting of compounds having the formula:

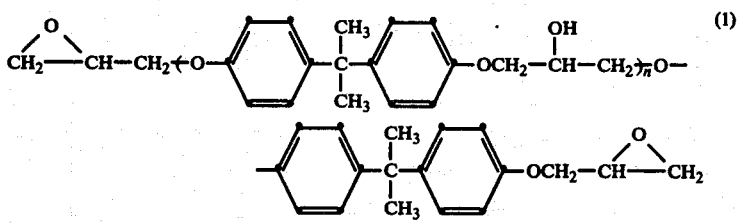

where n = 0 to 12;
(2) neopentyl glycol diglycidyl ether;

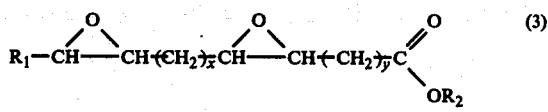

wherein $R_1$ is an alkylene having 1 to 12 carbon atoms, or arylene which can be substituted with alkyl or hydroxy;
x and y is 1 to 10;
$R_2$ is methyl, ethyl, propyl, butyl, hexyl or octyl;
(4) epoxidized tallate;
(5) epoxidized soybean oil; and
(C) about 0.05 to 1 part by weight of at least one conventional antioxidant.

5. A cellulose ester plastic composition according to claim 4 wherein said cyclic phosphonite is 9,10-dihydro-9-oxa-10-phosphaphenanthrene-10-oxide. 10-phosphaphenanthrene10-oxide.

6. A cellulose ester plastic composition according to claim 5 wherein said conventional antioxidant is tetrakis[methylene(3,5-di-tertbutyl-4-hydroxyhydrocinnanmate)methane].

7. A cellulose ester plastic composition according to claim 6 wherein said acid accepting epoxy compound is an epichlorohydrin/bisphenol A type epoxy resin.

8. A cellulose ester plastic composition according to claim 7 wherein said epichlorohydrin/bisphenol A type epoxy resin is present in an amount of 0.5 to 1.5 parts by weight per 100 parts of cellulose ester.

* * * * *